Dec. 20, 1960     H. C. WIEDERHOLD     2,965,426
FURNITURE LEG ADAPTER
Filed Jan. 7, 1959
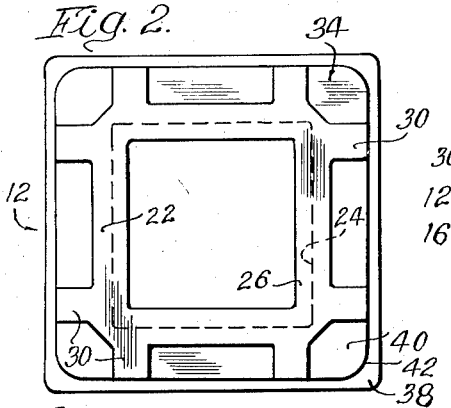
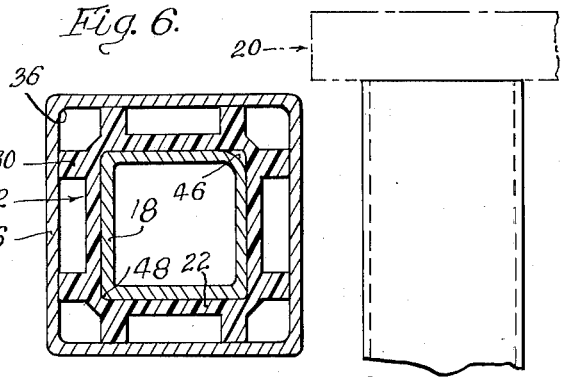
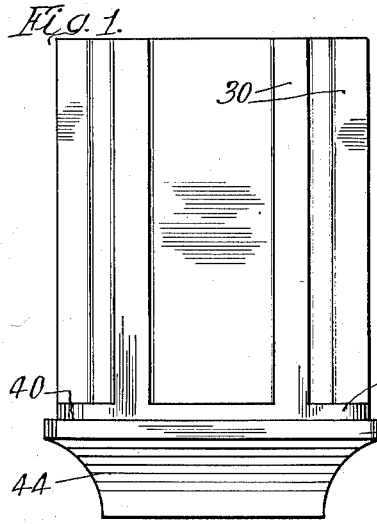
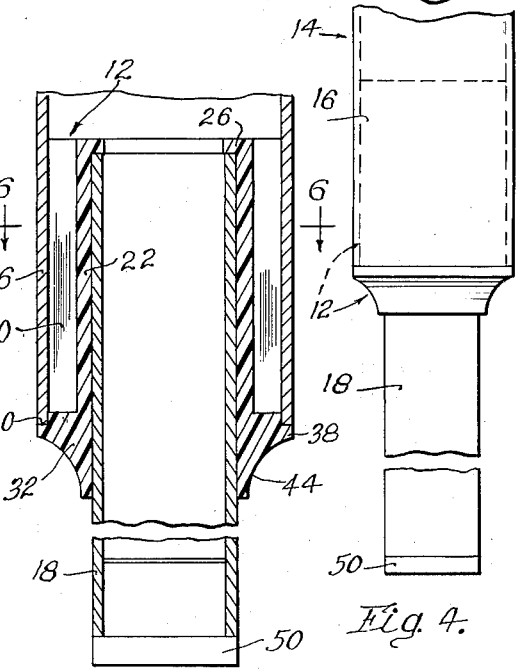
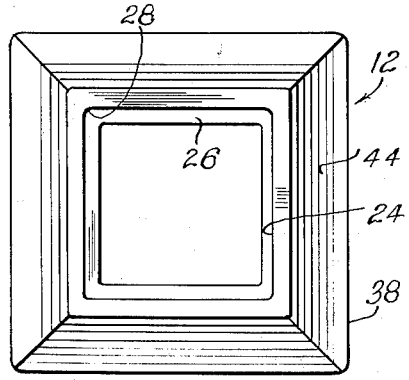
Inventor:
Harold C. Wiederhold
By Horton, Davis,
Brewer + Brugman Att'ys

United States Patent Office 2,965,426
Patented Dec. 20, 1960

2,965,426

FURNITURE LEG ADAPTER

Harold C. Wiederhold, Park Ridge, Ill., assignor to Empire Works, Chicago, Ill., a corporation of Illinois Filed Jan. 7, 1959, Ser. No. 785,513

7 Claims. (Cl. 311—109)

The present invention relates to a furniture leg adapter.

A broad object of the invention is to provide a novel adapter for joining two leg sections of different sizes, as for example, on a table such as a television table, occasional table, etc., which often has legs of stepped arrangement, each leg including a larger section at the top and a smaller one at the bottom.

Another object of the invention is to provide a simple adapter of the general character stated above which may be utilized for connecting the leg sections in a simple manner, as by merely telescoping the ends of the respective leg sections therewith.

Another object of the invention is to provide an adapter of the general character noted above which is of unitary and integral construction, such as a molded article of plastic material that is inexpensive although of strong and rugged construction.

Another and more specific object is to provide an adapter of the kind mentioned, namely, a unitary and integral molded article, that is readily adaptable to leg sections that are not truly accurate in shape and dimensions, with the advantage that the adapter itself need not be accurately shaped, although having the advantage of firmly and strongly interconnecting the leg sections.

Another object is to provide an adapter of the foregoing character of integral molded construction, which is of novel design such as to minimize the quantity of material required for its construction though providing the desired strength and firmness.

A still further object is to provide an adapter of the foregoing character that possesses a limited degree of resilience, the resilience deriving from the inherent resilience of the material forming the adapter as well as a novel shape and construction of the adapter.

Other objects and advantages of the invention will appear from the following detailed description taken in conjunction with the accompanying drawings, in which:

Fig. 1 is a side elevational view of the furniture leg adapter embodying the features of the present invention;

Fig. 2 is a top end view of the adapter;

Fig. 3 is a bottom end view;

Fig. 4 is an over-all view of a furniture leg in which the adapter of the invention is incorporated;

Fig. 5 is a longitudinal sectional view of a portion of the complete leg assembly, at the juncture in which the adapter is incorporated; and Fig. 6 is a transverse sectional view taken on line 6—6 of Fig. 5.

Referring now in detail to the drawings, attention is directed first to Figs. 1, 2 and 3 showing the adapter at 12 and to Fig. 4 showing a completed table leg incorporating the adapter. The adapter is shown in Fig. 4 partially in full view and partially in dotted outline. The complete leg in Fig. 4 is indicated at 14 and includes an upper relatively large section 16 and a lower relatively small section 18. The leg 14 is shown secured to a table 20 which is shown only partially and diagrammatically, to show the orientation of the leg and the adapter of the present invention. The leg sections 16 and 18 and the adapter are generally square in cross section, as represented in the drawings, but it will be understood that the invention is not limited to use with square elements, but to other shapes as well. The adapter 12 is generally tubular in shape and is telescoped with the leg sections, the latter also being mutually telescoped, with the adapter inserted in the upper larger leg section and receiving the lower smaller leg section. The larger leg section 16 is therefore tubular in construction as is also the lower smaller leg section, as illustrated, although a solid lower leg section may be accommodated readily. The leg 14, as disclosed is of metal construction, a kind to which the adapter is especially applicable.

The adapter 12 as stated above is constructed as a single unitary and integral article, and is molded from suitable material preferably a plastic material such as polyethylene. Such plastic material possesses a limited degree of resilience, this resilience being imparted to the finished article, and in addition, the article possesses resilience due to its special shape and construction, as described in detail hereinbelow.

Referring to the detailed construction of the adapter, it includes a tubular wall element 22 having an inner surface 24 dimensioned for snugly and frictionally fitting the outer surface of the lower leg section, in the assembly. The wall 22 has an inturned shoulder 26 at its upper end which is preferably peripherally continuous, the inner surface of the wall element being preferably uniform throughout the remainder of its length, to its lower end. For convenience, the adapter will be referred to as having an upper and a lower end, as oriented in Figs. 1 and 4, the adapter being applied to the furniture leg in this position.

The corners of the inner surface 24 of the wall 22, as indicated at 28, are rounded slightly, in conformity with accepted moulding operatings, although they are relatively sharp to accommodate relatively sharp corners of the metal leg section 18 as will be referred to again hereinbelow.

The wall element on outer surface is provided with a plurality of peripherally spaced longitudinal ribs 30 extending from the upper end downwardly to a point adjacent the lower end where they merge with a base portion 32. The ribs 30 preferably include two to a side, those on each of the sides being spaced apart and located adjacent the corners of the wall element, although spaced from the corners and directed outwardly perpendicular to the corresponding side of the wall element. Thus, there is a space as indicated at 34 at the corners between each two adjacent ribs that are next to the corner. The space 34 accommodates substantial inaccuracies and distortion of the corner portions of the outer leg section 16 at the locations indicated at 36. The bottom base section 32 is solid and continuous in radial and peripheral directions, terminating laterally outwardly in a bead or flange 38. This flange 38 extends laterally beyond the outer edges of the ribs 30 and provides an upwardly facing shoulder 40 for limiting engagement by the lower end surface of the upper leg section 16. This shoulder terminates inwardly in an extension 42 of the base portion 32 which rises above the shoulder and mutually merges with the lower ends of the ribs, and terminates outwardly at a position preferably flush with the outer edges of the ribs, so that when the adapter is in position in the upper leg section 16, the lower end portion of the latter firmly engages both the shoulder 40 and this extension 42. The laterally outer and lower surface of the base portion 32 follows a concave pattern as indicated at 44 to provide a finished appearance, best shown in Figs. 1 and 4.

To connect the sections of the leg, and in so doing to apply the adapter thereto, the adapter may be for example first inserted in the upper leg section 16. It is so inserted to a position in which the shoulder 40 engages the lower end surface of the leg section. In this position there is high friction contact engagement between the leg section and the ribs as well as between the leg section and the extension 42. This frictional engagement not only retains the adapter in the upper leg section but readily retains it there together with the lower leg section when the complete assembly is made.

As a next step in forming the assembly, the lower leg section 18 is inserted in the adapter and moved therein to the position shown in Fig. 5 in which the upper end surface thereof engages the shoulder 26 at the upper end of the adapter. In this case also there is high friction contact engagement between the lower leg section and the inner surface of the tubular wall 22 such as to normally retain the lower leg section therein by friction, when the leg is lifted from the supporting floor. The complete assembly is retained together by friction between the three members mentioned, namely, the upper leg section, the adapter, and the lower leg section. If desired the members may be assembled by first telescoping the adapter over the lower leg section and then inserting the adapter with the lower leg section therein in the upper leg section.

Square tubular metal legs are a common kind of leg used in tables of the type mentioned. Metal tubes such as are used in these legs are formed in different ways, one of which is to extrude the tubing round and thereafter reshape it to square cross section. In such operation, the intended accurate square shape is not always attained but oftentimes the tubing is quite inaccurate in shape. The adapter of the present invention can readily accommodate relatively great discrepancies in shapes of leg sections because of the inherent resilience in the material making up the adapter, and the resilience due to the special shape and construction of the adapter. The spaced apart ribs 30 provide spaces between the leg section and tubular wall element 22. These ribs in themselves, and individually, are enabled to flex and in so doing enable the wall element 22 to move toward and from the corresponding portion of the leg section 16. Also the resilience provided by the material forming the adapter enables a limited degree of movement between the wall element and leg section. The spacing apart of the ribs 30 accommodates relatively great discrepancies and inaccuracies relative to the intended accurate shape of the leg section not only in the flat side portions of the leg section, but the spaces at the corners indicated at 34 (Fig. 2) accommodate discrepancies due to various and somewhat random radii forming the corner portions of the leg section.

To a similar effect, the corners 28 on the inner surface 24 of the wall element 22 are relatively sharp, within the limits of accepted molding practices, so as to accommodate similar wide discrepancies in the lower smaller leg section as indicated in Fig. 6. The outer corners of a metal tube formed in the manner mentioned above, may be shaped about a relatively long radius as indicated at 46 or they may be relatively sharp as indicated at 48, and in either case they are readily accommodated while high friction engagement is maintained between the corresponding flat sides of the leg section and adapter.

An insert 50 may be fitted in the lower end of the lower leg section 18 for providing a finished effect, this insert not forming a part of the present invention.

The adapter of the present invention is capable of adapting leg sections of relatively great difference in dimensions. Adapters made according to the invention may be variously dimensioned for different sized leg sections by preselecting the thickness of the wall element 22 or preselecting the lateral dimensions of the ribs. Preferably this is done by varying the lateral dimensions of the ribs 30, and in that case the thickness of the wall element 22 may be made constant for different adapting conditions and thus held at a minimum. Thus, the amount of material making up the adapter is correspondingly maintained at a minimum.

In the example illustrated in the accompanying drawings the reduction in size from the larger leg section to the lower leg section is in the proportion of from 1¼" to ¾". However, the adapter may be dimensioned for accommodating other differences in sizes.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. An adapter comprising a tubular body generally square in cross section with straight side portions and adapted for telescoping interposition between relatively large and small generally square tubular leg sections, said body having an internal shoulder at an upper end for engagement by the corresponding end surface of the small leg section and an external shoulder at a lower end for engagement by the corresponding end surface of the large leg section, said body including a surrounding continuous wall element frictionally engageable with the small leg section, and a plurality of circumferentially spaced longitudinal ribs on its outer surface frictionally engageable with the inner surface of the large leg section, those ribs which are adjacent the corners of the wall element being spaced from the corners and extending perpendicular to the corresponding straight side portions of the wall element whereby the outer edges of adjacent ribs are spaced apart in direction peripherally around a corner of the wall element.

2. An adapter of integral construction and made of a plastic material having a limited degree of resilience, comprising a tubular wall element generally square in cross section adapted to receive therein a relatively small leg section of generally complementary shape with a tight friction fit and having on its inner surface adjacent an upper end a surrounding shoulder for limiting engagement by the upper end of the small leg section, the wall element having on its outer surface peripherally spaced longitudinal ribs adapted to engage with a tight friction fit the inner surface of a relatively large tubular leg section of complementary cross section, the ribs including at least two on each side of the adapter spaced apart and all of the ribs being spaced from the corners of the wall element so that all extend perpendicular to the corresponding sides of the wall element, the adapter including a peripherally continuous portion at its lower end forming a similarly continuous shoulder extending laterally beyond the outer edges of the ribs for limiting engagement by the lower end surface of the large leg section.

3. The invention set out in claim 2 in which the continuous lower end portion includes also a similarly continuous portion extending above the shoulder thereon and merging with the ribs and engageable with the inner surface of the large leg section.

4. The adapter set out in claim 2 in combination with the large and small leg sections telescoped with the adapter in the positions specified.

5. An adapter comprising a body made of material having a limited degree of resilience generally tubular in shape and having a surrounding wall element, for insertion in a relatively large tubular leg section and including a plurality of spaced ribs on its outer surface having mutually detached outer extremities engageable with the inner surface of the furniture leg section in which it is inserted, the body having a shoulder on each of its outer and inner surfaces and at each of its opposite ends of the body, respectively, for engagement by the end surfaces of a large leg section in which the body is inserted, and a small leg section which is inserted in the body, respectively, for limiting the leg sections in movement in telescoping relation to the body and each other.

6. An adapter comprising a tubular member for telescoping interposition between mutually telescoped relatively large and small leg sections of which at least the larger is tubular, the tubular member having spaced ribs on at least one surface and having mutually detached extremities engageable with the corresponding surface of the respective leg section, the tubular member having shoulders engageable with the end surfaces of the respective leg sections for limiting movement of the leg sections in telescoping direction, the body member being resilient whereby to provide for limited displacement between the leg sections in transverse and angular directions, the tubular member when so telescoped with leg sections as stated absorbing the entire end thrust between the leg sections.

7. An adapter comprising a tubular body generally square in cross section for telescoping interposition between relatively large and small generally square tubular leg sections, said body having an internal shoulder at an upper end for engagement by the corresponding end surface of the small leg section and an external shoulder at a lower end for engagement by the corresponding end surface of the large leg section, said body including a surrounding continuous wall element frictionally engageable with the small leg section, and a plurality of circumferentially spaced longitudinal ribs on its outer surface having mutually detached outer extremities frictionally engageable with the inner surface of the large leg section, the tubular body when so interposed with leg sections constituting the sole means for connecting the leg sections in a unitary assembly.

References Cited in the file of this patent

UNITED STATES PATENTS

| | | |
|---|---|---|
| 283,960 | Boyd | Aug. 28, 1883 |
| 719,146 | Schofield | Jan. 27, 1903 |
| 908,487 | Nail | Jan. 5, 1909 |
| 1,008,002 | Allen | Nov. 7, 1943 |
| 2,316,890 | Rockine | Apr. 20, 1943 |
| 2,446,406 | Beyerle | Aug. 3, 1948 |
| 2,868,602 | Drezner | Jan. 13, 1957 |